(12) United States Patent
Hattori et al.

(10) Patent No.: US 7,646,358 B2
(45) Date of Patent: Jan. 12, 2010

(54) IMAGE DISPLAY DEVICE

(75) Inventors: Reiji Hattori, Fukuoka (JP); Itsuo Tanuma, Sayama (JP); Yoshitomo Masuda, Hamura (JP); Norio Nihei, Kodaira (JP); Ryou Sakurai, Kokubunji (JP); Hajime Tamura, Kawasaki (JP); Hirotaka Yamazaki, Kunitachi (JP)

(73) Assignee: Bridgestone Corporation, Tokyo (JP)

( * ) Notice: Subject to any disclaimer, the term of this patent is extended or adjusted under 35 U.S.C. 154(b) by 733 days.

(21) Appl. No.: 10/520,465

(22) PCT Filed: Jul. 8, 2003

(86) PCT No.: PCT/JP03/08647

§ 371 (c)(1),
(2), (4) Date: Aug. 17, 2005

(87) PCT Pub. No.: WO2004/006006

PCT Pub. Date: Jan. 15, 2004

(65) Prior Publication Data

US 2005/0285500 A1    Dec. 29, 2005

(30) Foreign Application Priority Data

Jul. 9, 2002   (JP) ............................. 2002-199571
Jul. 9, 2002   (JP) ............................. 2002-199575
Jul. 10, 2002  (JP) ............................. 2002-201139
Jul. 15, 2002  (JP) ............................. 2002-205355

(51) Int. Cl.
*G09G 3/00* (2006.01)
(52) U.S. Cl. ........................... 345/31; 345/55; 345/204

(58) Field of Classification Search ................... 345/31, 345/55, 204
See application file for complete search history.

(56) References Cited

U.S. PATENT DOCUMENTS 3,936,816 A * 2/1976 Murata ........................ 345/50

(Continued)

FOREIGN PATENT DOCUMENTS

EP    0 709 713 A2    5/1996

(Continued)

OTHER PUBLICATIONS

Kokurai Cho et al..; "Denkaichu ni okeru Ryushi Ido o Riyo Shita Hanshagata Denshi Display (I)—Hyoji Genri to Hyoji Tokusei"; The Journal of Imaging Society of Japan; vol. 39, No. 4, Dec. 10, 2000; pp. 20-25.

(Continued)

*Primary Examiner*—Richard Hjerpe
*Assistant Examiner*—Leonid Shapiro
(74) *Attorney, Agent, or Firm*—Sughrue Mion, PLLC

(57) ABSTRACT

In an image display device which has an image display panel, in which two or more groups of particles or liquid powders having different colors and different charge characteristics are sealed between opposed two substrates, at least one of two substrates being transparent, and, in which the particles or the liquid powders, to which an electrostatic field produced by a pair of electrodes provided on one substrate or both substrates respectively is applied, are made to move so as to display an image, a chip for transmitting a drive signal to the image display panel is arranged in the substrate (first aspect of the invention), or, the two substrates are constructed by a transparent substrate and the pair of electrodes are constructed by a transparent electrode (second aspect of the invention).

4 Claims, 11 Drawing Sheets

U.S. PATENT DOCUMENTS 6,407,763 B1 * 6/2002 Yamaguchi et al. ......... 347/112
6,636,186 B1 10/2003 Yamaguchi et al.

FOREIGN PATENT DOCUMENTS

| JP | 2001-290178 A | 10/2001 |
| JP | 2001-312225 A | 11/2001 |
| JP | 2002-139750 A | 5/2002 |
| JP | 2002-148662 A | 5/2002 |
| JP | 2002-532756 A | 10/2002 |
| WO | 99/10769 A1 | 3/1999 |
| WO | WO 00/36465 A1 | 6/2000 |

OTHER PUBLICATIONS

Supplementary European Search Report dated Apr. 24, 2008.
Hattori, Reiji, et al., "20.3: Novel Type of Bistable Reflective Display Using Quick Response Liquid Powder," 2003 SID International Symposium Digest of Technical Papers, Baltimore, MD, May 20-22, 2003; SID International Symposium Digest of Technical Papers, San Jose, CA, vol. 34/2, May 20, 2003, pp. 846-849.

* cited by examiner

FIG. 7
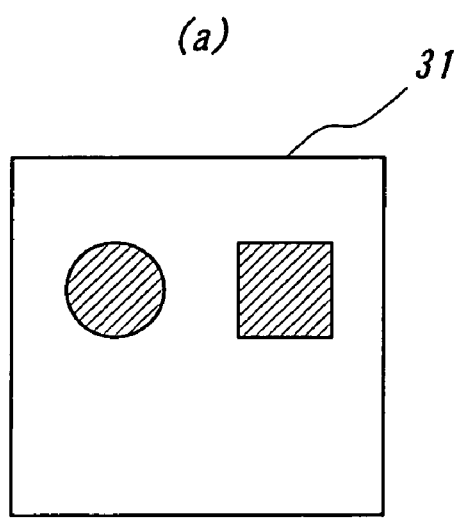
Display on front surface
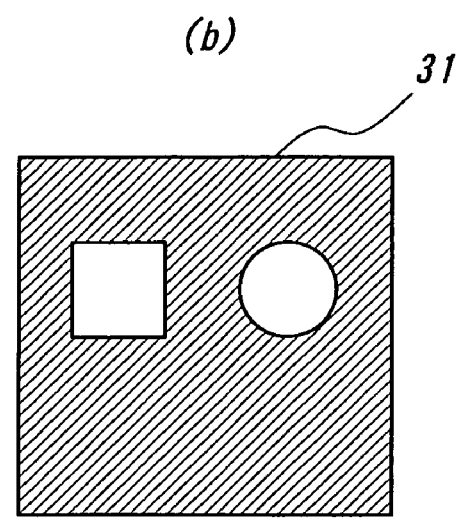
Display on rear surface

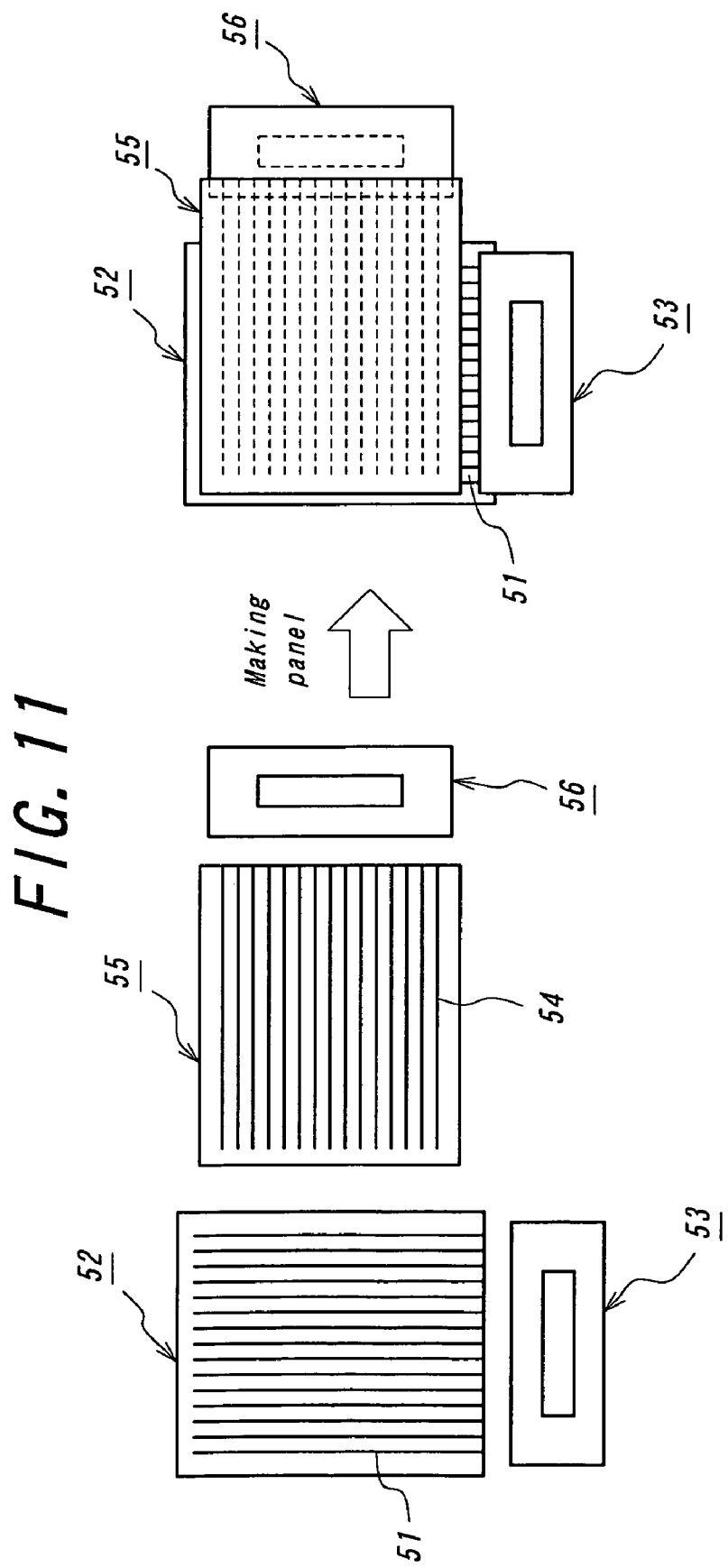

IMAGE DISPLAY DEVICE

This is a national stage entry of international application no. PCT/JP03/08647, which was filed on Jul. 8, 2003, and which claims the benefit of JP2002199571, filed on Jul. 9, 2002, JP2002199575, filed on Jul. 9, 2002, JP2002201139, filed on Jul. 10, 2002, and JP2002205355, filed on Jul. 15, 2002, all of which are hereby incorporated by reference.

TECHNICAL FIELD

The present invention relates to an image display device, which comprises an image display panel enables to repeatedly display or delete images accompanied by flight and movement of particles or liquid powders utilizing Coulomb's force and so on. Particularly, the present invention relates to an image display device, which comprises an image display panel achieving a compact size and a narrow frame (first aspect of the invention), and, the present invention relates to an image display device, which comprises an image display panel achieving a display on both surfaces thereof and a thin construction (second aspect of the invention).

BACKGROUND ART

As an image display device substitutable for liquid crystal display (LCD), image display devices with the use of technology such as an electrophoresis method, an electro-chromic method, a thermal method, dichroic-particles-rotary method are proposed.

As for these image display device, it is conceivable as inexpensive visual display device of the next generation from a merit having wide field of vision close to normal printed matter, having smaller consumption with LCD, spreading out to a display for portable device, and an electronic paper is expected. Recently, electrophoresis method is proposed that microencapsulate dispersion liquid made up with dispersion particles and coloration solution and dispose the liquid between faced substrates.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

Further, as one method of solving various problems mentioned above, it is known an image display device which comprises an image display panel, in which two or more groups of particles having different colors and different charge characteristics are sealed between two substrates, at least one of two substrates being transparent, and, in which the particles, to which an electrostatic field produced by a pair of electrodes having different potentials is applied, are made to move by means of Coulomb's force so as to display an image. In addition, it is known an image display device which comprises an image display panel, in which the liquid powders, which indicate a high fluidity in an aerosol state such that solid-like substances are suspended in a gas stably as dispersoid, are sealed between opposed two substrates, at least one of two substrates being transparent, and, in which the liquid powders, to which an electrostatic field produced by a pair of electrodes provided on one substrate or both substrates respectively is applied, are made to move so as to display an image.

In the image display devices mentioned above, in order to generate an electrostatic field between a pair of electrodes provided on the substrate, it is necessary to transmit a drive signal to the paired electrodes. Therefore, it is necessary to arrange a chip for transmitting the drive signal near the substrate. That is to say, as shown in FIG. 11, TCP (Tape Carrier Package) 53 for mounting a chip (not shown) is arranged to an end portion of a transparent substrate 52 on which a plurality of display electrodes 51 are provided. In addition, TCP 56 is arranged to an edge portion of an opposed substrate 55 on which a plurality of opposed electrodes 54 intersecting with the display electrodes 51 at right angles are provided. Then, the drive signal is controlled by the chips arranged to the TCP's 53, 56.

Therefore, in the image display device mentioned above, when the image display panel is constructed by stacking the transparent substrate 52 and the opposed substrate 55 in such a manner that the display electrodes 51 are opposed to the opposed electrodes 54 as shown in FIG. 11, it is necessary to form a frame portion to which TCP's 53, 56, that are not contributed to an image display, are connected. In this embodiment, there is a drawback such that it is not possible to achieve a compact size and a narrow frame, which are highly required for the image display device recently (Task to be solved by a first aspect of the invention).

Moreover, in the image display device mentioned above, it is possible to perform an image display, which can achieve rapid response rate due to a dry type display, simple construction, inexpensive cost and excellent stability, but it is not possible to display an image on a rear surface thereof due to its construction. In this embodiment, there is a drawback such that it is not possible to obtain the image display device enables to display an image on both surfaces of the image display panel, which are highly required for achieving a high performance image display (Task to be solved by a second aspect of the invention).

DISCLOSURE OF INVENTION

An object of the first aspect of the invention is to eliminate the drawbacks mentioned above and to provide an image display device having rapid response rate due to dry type display, simple construction, inexpensive cost and excellent stability, which can further achieve a compact size and a narrow frame of an image display panel.

Moreover, an object of a second aspect of the invention is to eliminate the drawbacks mentioned above and to provide an image display device having rapid response rate due to dry type display, simple construction, inexpensive cost and excellent stability, which can further achieve an image display on both surfaces of the image display panel.

According to a first embodiment of the first aspect of the invention, an image display device which comprises an image display panel, in which two or more groups of particles having different colors and different charge characteristics are sealed between opposed two substrates, at least one of two substrates being transparent, and, in which the particles, to which an electrostatic field produced by a pair of electrodes provided on one substrate or both substrates respectively is applied, are made to move so as to display an image, is characterized in that a chip for transmitting a drive signal to the image display panel is arranged in the substrate.

Moreover, according to a second embodiment of the first aspect of the invention, an image display device which comprises an image display panel, in which the liquid powders, which indicate a high fluidity in an aerosol state such that solid-like substances are suspended in a gas stably as dispersoid, are sealed between opposed two substrates, at least one of two substrates being transparent, and, in which the liquid powders, to which an electrostatic field produced by a pair of electrodes provided on one substrate or both substrates respectively is applied, are made to move so as to display an image, is characterized in that a chip for transmitting a drive signal to the image display panel is arranged in the substrate.

In the first embodiment and the second embodiment of the first aspect of the invention, since the image display panel has a construction such that no backlight is utilized, it is possible to arrange the chip for transmitting a drive signal to the image display panel in the substrate. Therefore, it is possible to remove TCP, which is necessary arrange at a portion protruded from an image display portion of the known image display panel, and thus it is possible to achieve a compact size and a narrow frame of the image display panel.

As the particles used in the image display device according to the first embodiment of the first aspect of the invention, it is preferred that an average particle diameter of the particles is 0.1-50 μm. Moreover, as a charge amount of the particles, it is preferred that the difference of a surface charge density in an absolute value between two groups of the particles measured by using the same kind of carrier in accordance with a blow-off method is 5-150 μC/m². Further, it is preferred that the particles are particles in which the maximum surface potential, in the case that the surface of particles is charged by a generation of Corona discharge caused by applying a voltage of 8 KV to a Corona discharge device deployed at a distance of 1 mm from the surface of the particles, is greater than 300 V at 0.3 second after the Corona discharge.

In addition, as the liquid powders used in the image display device according to the second embodiment of the first aspect of the invention, it is preferred that an apparent volume in a maximum floating state of the liquid powders is two times or more than that in none floating state. Moreover, it is preferred that a time change of the apparent volume of the liquid powders satisfies the following formula: $V_{10}/V_5 > 0.8$; (here, $V_5$ indicates the apparent volume (cm³) of the liquid powders after 5 minutes from the maximum floating state; and $V_{10}$ indicates the apparent volume (cm³) of the liquid powders after 10 minutes from the maximum floating state). Further, it is preferred that an average particle diameter d(0.5) of the liquid powders is 0.1-20 μm.

According to a first embodiment of the second aspect of the invention, an image display device which comprises an image display panel, in which two or more groups of particles having different colors and different charge characteristics are sealed between opposed two substrates, at least one of two substrates being transparent, and, in which the particles, to which an electrostatic field produced by a pair of electrodes provided on both substrates respectively is applied, are made to move so as to display an image, is characterized in that the two substrates are constructed by a transparent substrate and the pair of electrodes are constructed by a transparent electrode.

Moreover, according to a second embodiment of the second aspect of the invention, an image display device which comprises an image display panel, in which the liquid powders, which indicate a high fluidity in an aerosol state such that solid-like substances are suspended in a gas stably as dispersoid, are sealed between opposed two substrates, at least one of two substrates being transparent, and, in which the liquid powders, to which an electrostatic field produced by a pair of electrodes provided on both substrates respectively is applied, are made to move so as to display an image, is characterized in that the two substrates are constructed by a transparent substrate and the pair of electrodes are constructed by a transparent electrode.

In the first embodiment and the second embodiment of the second aspect of the invention, since all the substrates and all the electrodes of the image display panel are constructed by the transparent substrate and the transparent electrode, it is possible to display the image not only on a front surface but also on a rear surface. In this manner, the image display panel of a very thin-type can be realized, and it is possible to add different functions (for example, one surface: monochrome display and the other surface: color display) to respective surfaces, so that it is possible to realize the high performance image display device.

In the image display device according to the first embodiment and the second embodiment of the second aspect of the invention, the followings are the preferred construction for adding different functions to the front surface and the rear surface respectively. That is, it is preferred: that colors of the particles or the liquid powders are white color and black color, and a monochrome display is performed on both surfaces of the image display panel; that colors of the particles or the liquid powders are white color and black color, and a color filter is provided on one of the substrates, so that a monochrome display is performed on one surface of the image display panel and a color display is performed on the other surface of the image display panel, to which the color filter is provided; and that color combinations of the particles or the liquid powders in three image display elements, which construct one pixel of the image, are black color and red color; black color and green color; and black color and blue color; respectively, so that a color display is performed on both surfaces of the image display panel.

As the particles used in the image display device according to the first embodiment of the second aspect of the invention, it is preferred that an average particle diameter of the particles is 0.1-50 μm. Moreover, as a charge amount of the particles, it is preferred that the difference of a surface charge density in an absolute value between two groups of the particles measured by using the same kind of carrier in accordance with a blow-off method is 5-150 μC/m². Further, it is preferred that the particles are particles in which the maximum surface potential, in the case that the surface of particles is charged by a generation of Corona discharge caused by applying a voltage of 8 KV to a Corona discharge device deployed at a distance of 1 mm from the surface of the particles, is greater than 300 V at 0.3 second after the Corona discharge.

In addition, as the liquid powders used in the image display device according to the second embodiment of the first aspect of the invention, it is preferred that an apparent volume in a maximum floating state of the liquid powders is two times or more than that in none floating state. Moreover, it is preferred that a time change of the apparent volume of the liquid powders satisfies the following formula: $V_{10}/V_5 > 0.8$; (here, $V_5$ indicates the apparent volume (cm³) of the liquid powders after 5 minutes from the maximum floating state; and $V_{10}$ indicates the apparent volume (cm³) of the liquid powders after 10 minutes from the maximum floating state). Further, it is preferred that an average particle diameter d(0.5) of the liquid powders is 0.1-20 μm.

In the second embodiment of the first aspect and the second aspect of the invention, a term "liquid powder" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powder.

That is, as is the same as the definition of the liquid crystal (intermediate phase between a liquid and a solid), the liquid powder according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the image display device according to the invention, a solid material is used as a dispersant.

BRIEF DESCRIPTION OF DRAWINGS

FIGS. 7a and 7b are schematic views respectively showing one embodiment of a display of the image display panel in the image display device according to a second aspect of the invention.

FIG. 11 is a schematic view explaining one embodiment of the image display panel constituting the known image display device.

BEST MODE FOR CARRYING OUT THE INVENTION

At first, common construction of the image display device according to a first aspect and a second aspect of the invention.

Figure 1A:
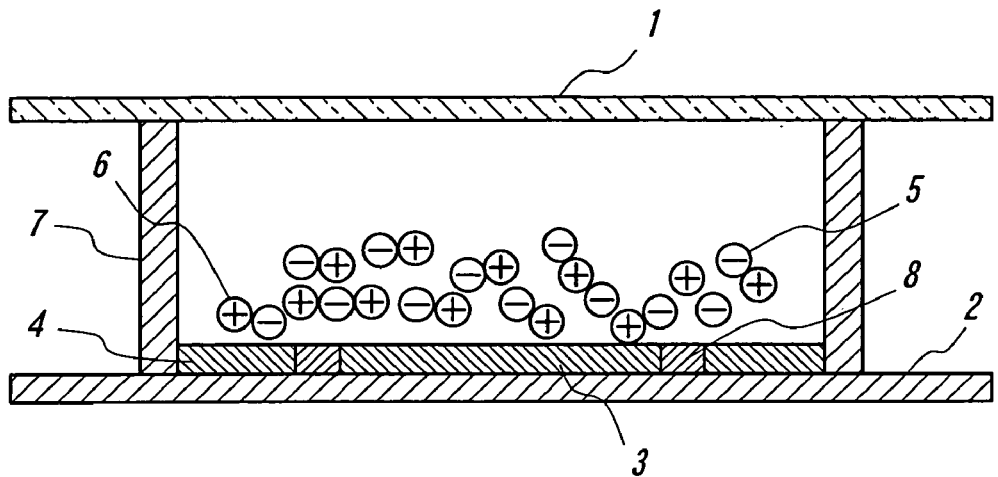
FIGS. 1a-1c are schematic views respectively showing one embodiment in an image display element of the image display panel constituting the image display device according to the invention and its display driving theory.
Figure 1B:
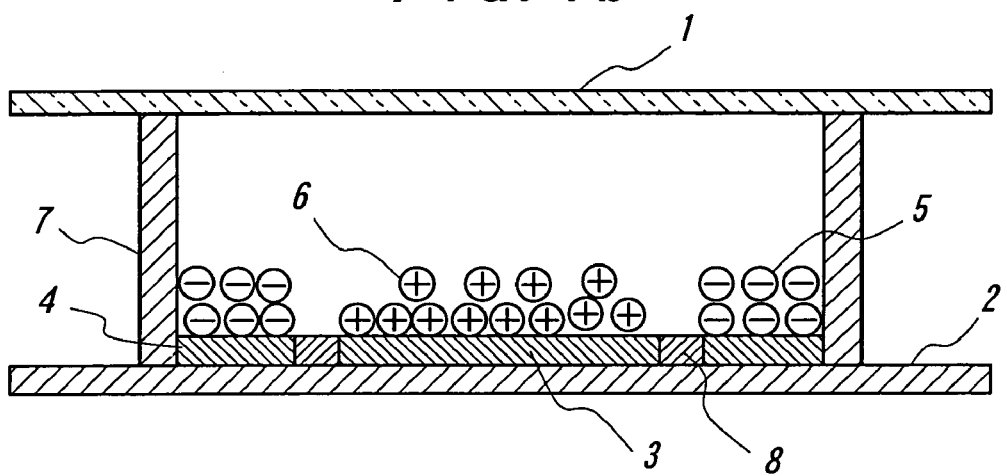
Figure 1C:
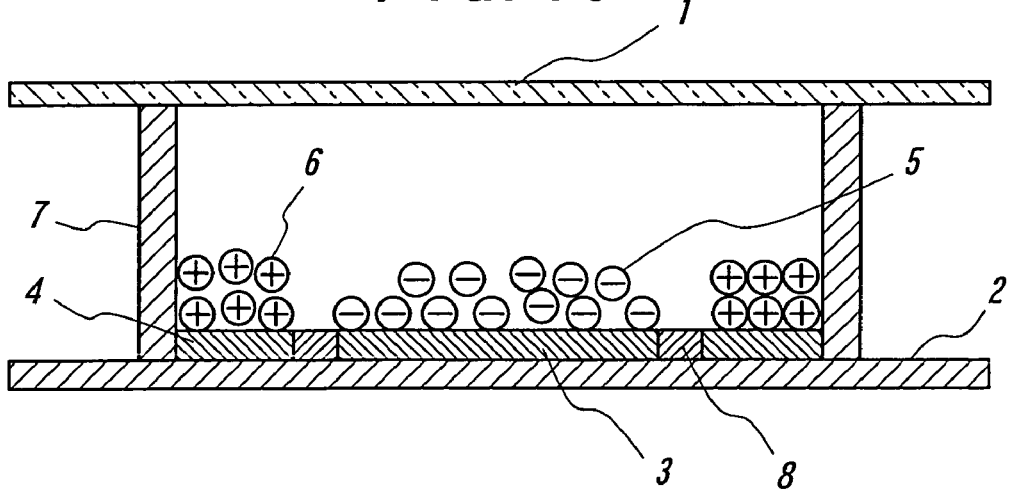

FIGS. 1a to 1c are schematic views respectively showing one embodiments of the image display element of the image display panel used for the image display device according to the invention and its display driving method. In the embodiments shown in FIGS. 1a to 1c, numeral 1 is a transparent substrate, numeral 2 is an opposed substrate, numeral 3 is a display electrode, numeral 4 is an opposed electrode, numeral 5 is a negatively chargeable particle, numeral 6 is a positively chargeable particle, numeral 7 is a partition wall and numeral 8 is an insulation member.

FIG. 1a shows a state such that the negatively chargeable particles 5 and the positively chargeable particles 6 are arranged between opposed substrates (transparent substrate 1 and opposed substrate 2). Under such a state, when a voltage is applied in such a manner that a side of the display electrode 3 becomes low potential and a side of the opposed electrode 4 becomes high potential, as shown in FIG. 1b, the positively chargeable particles 6 fly and move to the side of the display electrode 3 and the negatively chargeable particles 5 fly and move to the side of the opposed electrode 4 by means of Coulomb's force. In this case, a display face viewed from a side of the transparent substrate 1 looks like a color of the positively chargeable particles 6. Next, when a voltage is applied in such a manner that the side of the display electrode 3 becomes high potential and the side of the opposed electrode 4 becomes low potential by reversing potentials, as shown in FIG. 1c, the negatively chargeable particles 5 fly to move to the side of the display electrode 3 and the positively chargeable particles 6 fly to move to the side of the opposed electrode 4 by means of Coulomb's force. In this case, the display face viewed from the side of the transparent substrate 1 looks like a color of the negatively chargeable particles 5.

The display states shown in FIGS. 1b and 1c are repeatedly changeable only by reversing the potentials of a power source, and thus it is possible to change colors on the display face reversibly by reversing the potentials of the power source as mentioned above. The colors of the particles can be arbitrarily selected. For example, when the negatively chargeable particles 5 are white color and the positively chargeable particles 6 are black color, or, when the negatively chargeable particles 5 are black color and the positively chargeable particles 5 are white color, a reversible image display between white color and black color can be performed. In this method, since the particles are once adhered to the electrode by means of an imaging force, a display image can be maintained for a long time after a voltage apply is stopped, thereby showing an excellent memory property.

In the present invention, since the chargeable particles fly and move in the gas, the response rate of the image display is extremely fast and the response rate of shorter than 1 msec may be possible. Moreover, it is not necessary to use an orientation film and a polarizing plate as the liquid crystal display, and thus it is possible to make the structure simple and to realize the image display device having a large display area at a lower cost. In addition, it is stable with respect to a temperature variation and can be used in a wide temperature range from a low temperature to a high temperature. Further, it is not affected by an angle of visual field and has a high reflection coefficient. Therefore, it is easily viewable and has low electric power consumption. Furthermore, it has an excellent memory property and thus it is not necessary to use an electric power when the image is to be maintained.

Figure 2A:
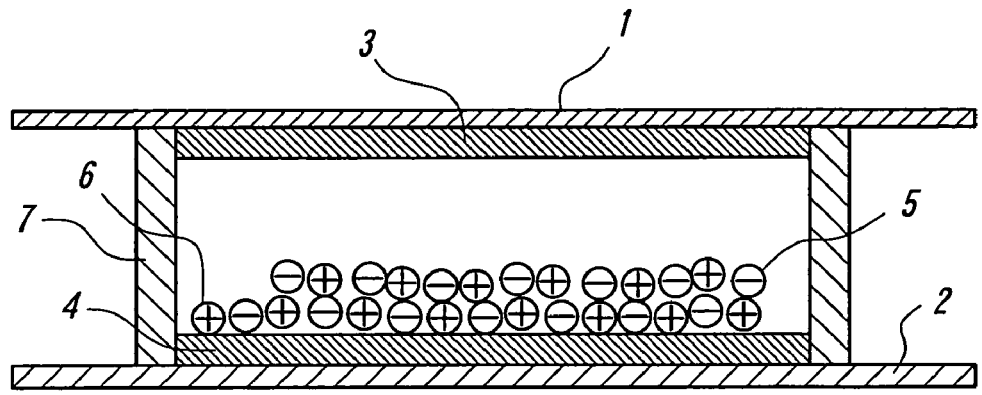
FIGS. 2a-2c are schematic views respectively illustrating another embodiment in an image display element of the image display panel constituting the image display device according to the invention and its display driving theory.
Figure 2B:
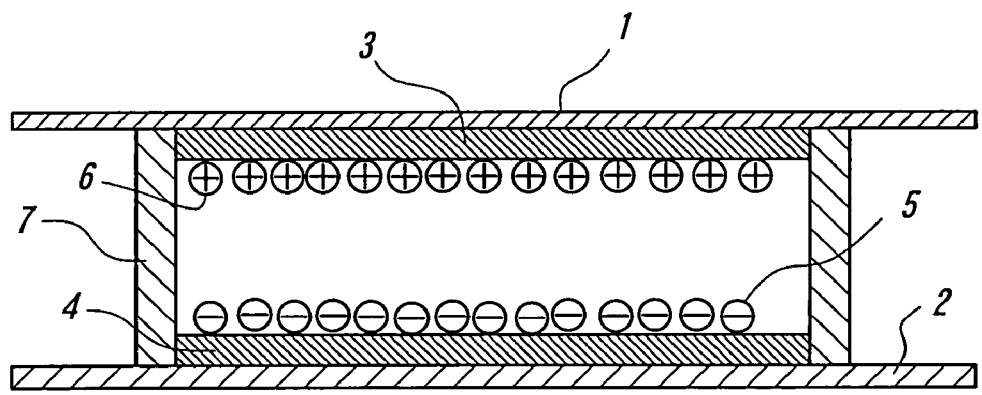
Figure 2C:
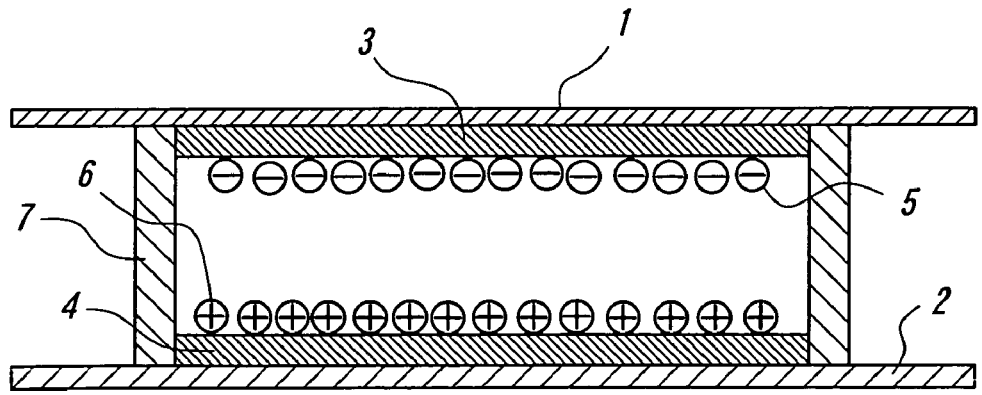

FIGS. 2a-2c are schematic views respectively illustrating another embodiment in an image display element of the image display panel constituting the image display device according to the invention and its display driving theory.

FIG. 2a shows a state such that the negatively chargeable particles 5 and the positively chargeable particles 6 are arranged between opposed substrates (transparent substrate 1 and opposed substrate 2). Under such a state, when a voltage is applied in such a manner that a side of the display electrode 3 becomes low potential and a side of the opposed electrode 4 becomes high potential, as shown in FIG. 2b, the positively chargeable particles 6 fly and move to the side of the display electrode 3 and the negatively chargeable particles 5 fly and move to the side of the opposed electrode 4 by means of Coulomb's force. In this case, a display face viewed from a side of the transparent substrate 1 looks like a color of the positively chargeable particles 6. Next, when a voltage is applied in such a manner that the side of the display electrode 3 becomes high potential and the side of the opposed electrode 4 becomes low potential by reversing potentials, as shown in FIG. 2c, the negatively chargeable particles 5 fly to move to the side of the display electrode 3 and the positively chargeable particles 6 fly to move to the side of the opposed electrode 4 by means of Coulomb's force. In this case, the display face viewed from the side of the transparent substrate 1 looks like a color of the negatively chargeable particles 5.

In the embodiment shown in FIG. 2, irrespective of the embodiments shown in FIGS. 1a to 1c, the display electrode 3 is arranged to the transparent substrate 1 and the opposed electrode 4 is arranged to the opposed substrate 2. In the embodiment shown in FIG. 2, it is necessary to use a transparent electrode as the display electrode 3. On the other hand, in the embodiments shown in FIGS. 1a to 1c, since an opaque electrode can be used as the display electrode 3, it is possible to use a metal electrode having an inexpensive cost and a low resistance such as copper, aluminum and so on, and thus it is preferred. It should be noted that, in the embodiments shown in FIGS. 1a-1c and 2a-2c, the explanation is made to a first embodiment according to the first aspect and the second aspect of the invention utilizing the negatively chargeable particles 5 and the positively chargeable particles 6, but the same explanation can be applied to a second embodiment according to the first aspect and the second aspect of the invention utilizing the liquid powders by changing the negatively chargeable particles 5 to negatively chargeable liquid powders and the positively chargeable particles 6 to positively chargeable liquid powders.

Then, respective features of the image display devices according to the first aspect and the second aspect of the invention will be explained in this order. It should be noted that the following explanations are made to the particles, but the same explanations can be applied to the liquid powders.

The most important feature of the image display device according to the first aspect of the invention having the construction mentioned above is to arrange the chip for transmitting a drive signal to the image display panel in the opposed substrate 2. That is to say, the chip is arranged to a surface of the substrate 2 at a side opposed to a side to which the display electrode 3 and the opposed substrate 4 are arranged (example of FIG. 1), or, the chip is arranged to a surface of the substrate 2 at a side opposed to a side to which the opposed electrode 4 is arranged (example of FIG. 2).

Figure 3:
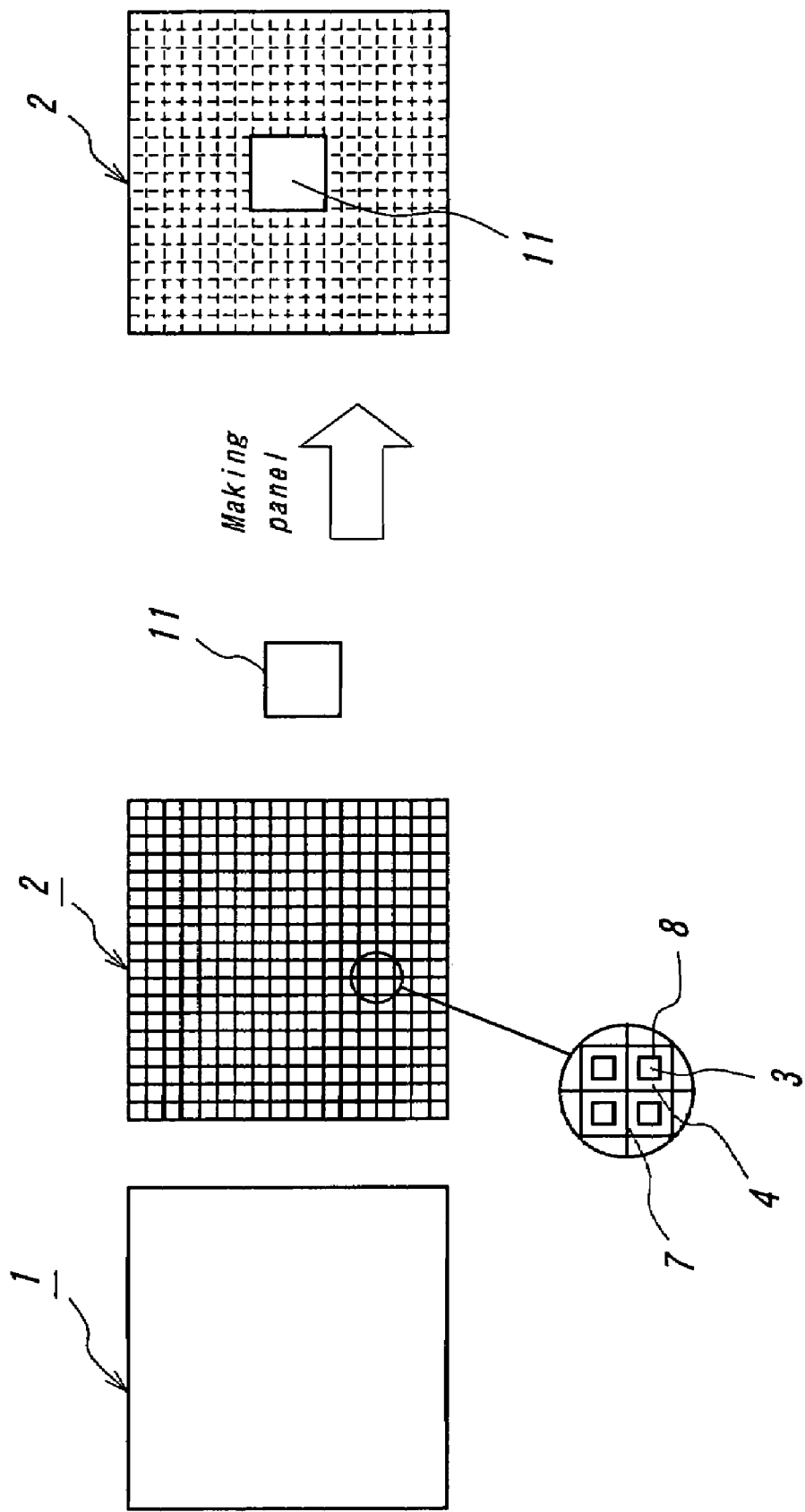
FIG. 3 is a schematic view explaining one embodiment of an installation operation such that a chip is arranged to a rear surface of the substrate in the image display panel constituting the image display device according to a first aspect of the invention.

In the image display panels having the constructions shown in FIGS. 1a-1c, the transparent substrate 1 and the opposed substrate 2 having the display electrode 3 arranged at a center of respective image display elements and the opposed electrode 4 surrounding it are prepared, and a chip 11 for transmitting a drive signal to the image display panel is arranged on a surface of the opposed substrate 2 at a side opposed to a side to which the display electrode 3 and the opposed electrode 4 are arranged, as shown in FIG. 3. The display electrode 3 and the opposed electrode 4 are connected to the chip 11 at respective image display elements by means of a circuit (not shown here) formed on a surface to which the chip 11 is arranged. Then, the image display panel used for the image display device according to the invention is constructed by stacking the transparent substrate 1 and the opposed substrate 2 to make a panel. In this manner, it is possible to eliminate the TCP, which is necessary to arrange at the peripheral portion of the transparent substrate 1 and the opposed substrate 4 respectively in the known device shown in FIG. 11. As a result, it is possible to achieve a compact size and a narrow frame of the image display panel.

Figure 4:
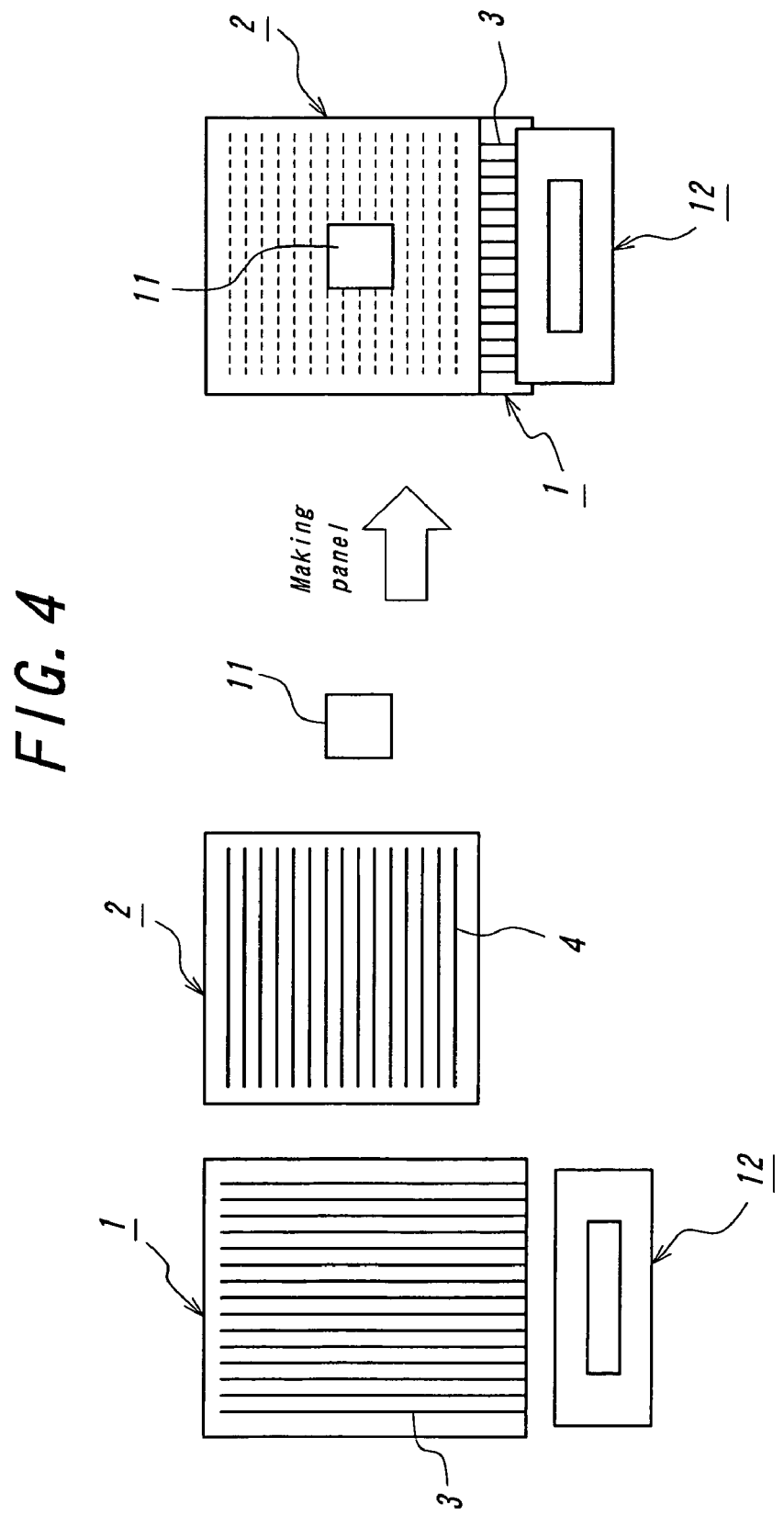
FIG. 4 is a schematic view explaining another embodiment of an installation operation such that a chip is arranged to a rear surface of the substrate in the image display panel constituting the image display device according to the first aspect of the invention.

Moreover, in the image display panels having the constructions shown in FIGS. 2a-2c, the transparent substrate 2 to which TCP 12 for mounting the chip 11 is arranged at its end portion and the opposed substrate 2 to which a plurality of opposed electrodes 4 are arranged in such a manner that the display electrodes 3 are intersected at a right angle are prepared, and the chip 11 for transmitting a drive signal to the image display panel is arranged on a surface of the opposed substrate 2 at a side opposed to a side to which the display electrode 3 and the opposed electrode 4 are arranged, as show in FIG. 4. The opposed electrode 4 is connected to the chip 11 at respective image display elements by means of a circuit (not shown here) formed on a surface to which the chip 11 is arranged. Then, the image display panel used for the image display device according to the invention is constructed by stacking the transparent substrate 1 and the opposed substrate 2 to make a panel in such a manner that the display electrode 3 and the opposed electrode 4 are opposed. In this manner, it is possible to eliminate the TCP of the opposed electrode 4, which is necessary in the known device. As a result, it is possible to achieve a compact size and a narrow frame of the image display panel, which is inferior to the embodiment shown in FIG. 3 but is superior to the known device.

Figure 5:
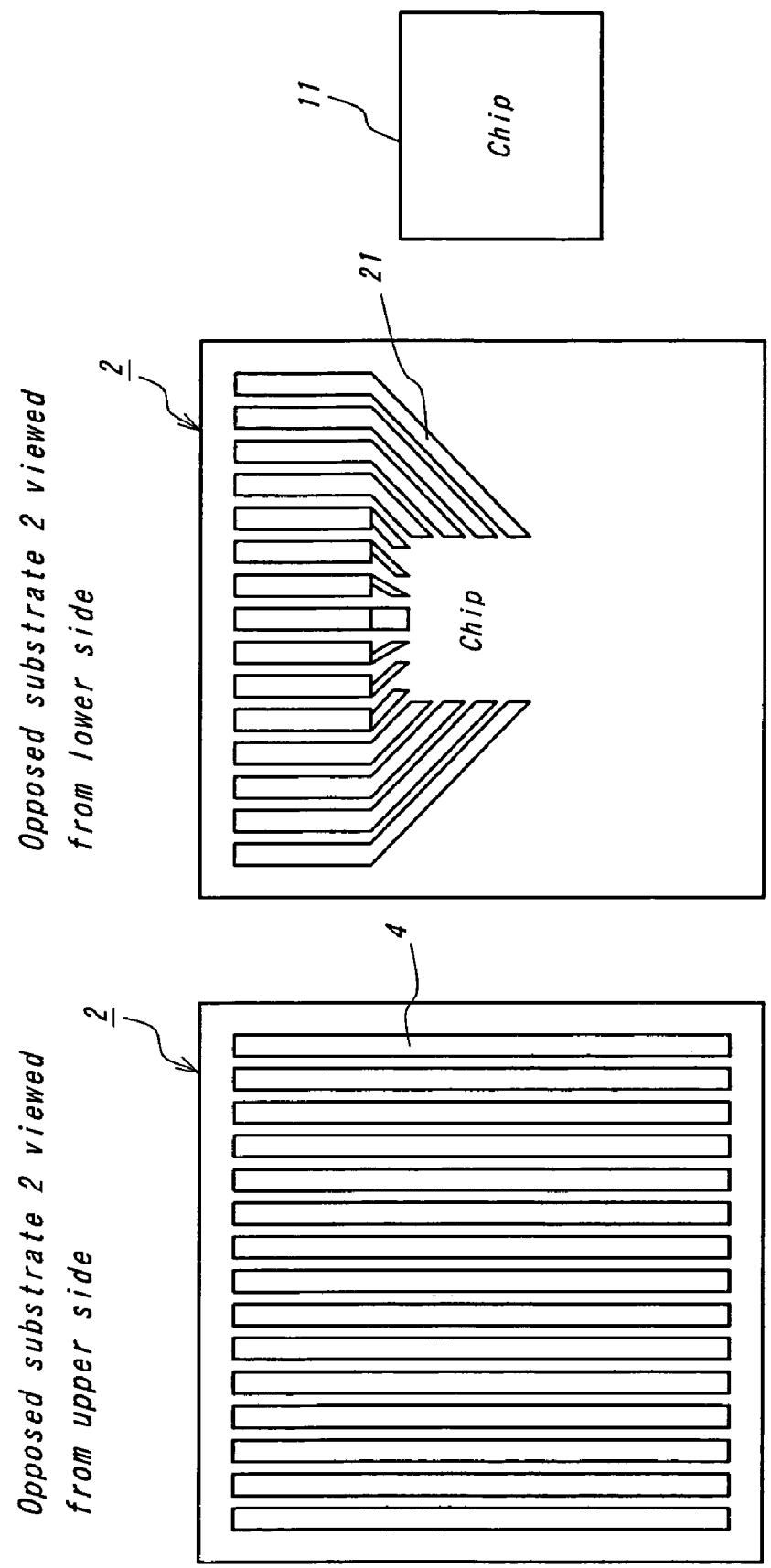
FIG. 5 is a schematic view explaining a relation of an opposed substrate, an opposed electrode and a chip in the embodiment shown in FIG. 4.
Figure 6:
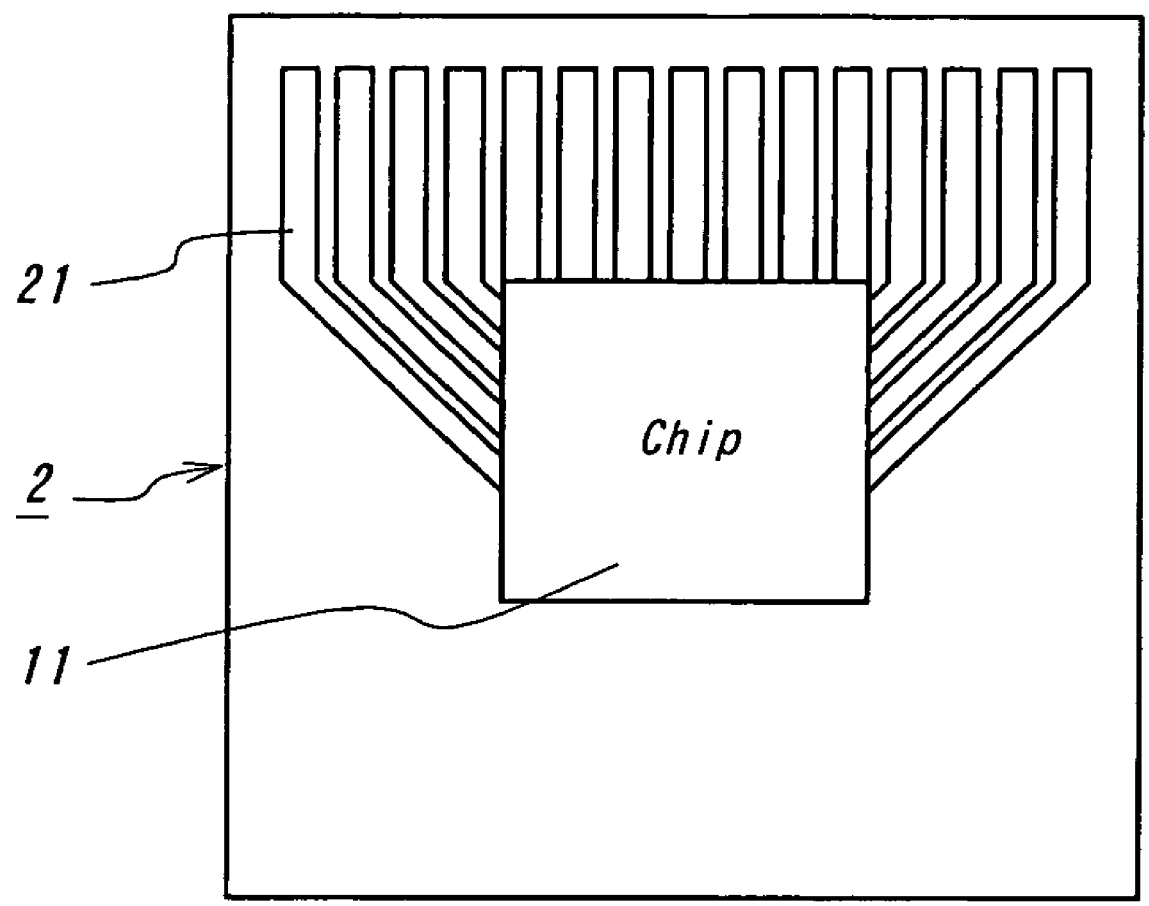
FIG. 6 is a schematic view depicting an installation state such that the chip is arranged to the opposed substrate in the embodiment shown in FIG. 4.

Further, FIG. 5 shows a relation of the opposed substrate 2, the opposed electrode 4 and the chip 11 in the embodiment shown in FIG. 4, and, FIG. 6 illustrates a state such that the chip 11 is installed to the opposed substrate 2. In FIG. 5 and FIG. 6, a numeral 21 is a circuit formed by means of a printed wiring and so on to a surface of the opposed substrate 2 at a side opposed to a side to which the opposed electrode 4 is arranged.

The most important feature of the image display device according to the second aspect of the invention having the construction mentioned above is to not only use the transparent substrate 1 and the transparent display electrode 3 but also construct the opposed substrate 2 and the opposed electrode 4 by the transparent substrate and the transparent electrode in the image display panel having the construction mentioned above. Then, it is possible to achieve a variation of the image display by changing colors of the negatively chargeable particles 5 and the positively chargeable particles 6, and, by changing the construction of the image display element in the image display panel. Hereinafter, examples in which the colors of the particles and the construction of the image display element are changed will be explained.

At first, it is assumed that: one pixel of the image is constructed by one unit of the image display element shown in FIGS. 1a-1c; and for example a color of the negatively chargeable particles 5 is white and a color of the positively chargeable particles 6 is black. In this case, it is possible to perform a monochrome display on both surfaces of the image display panel by controlling a direction and strength of an electrostatic field generated by a pair of electrodes constructed by the display electrode 3 and the opposed electrode 4. In this embodiment, as shown in FIGS. 7a and 7b, it is possible to display figures and so on by a black color or a white color on both surfaces of an image display panel 3 at corresponding portions at the same time.

Figure 8:
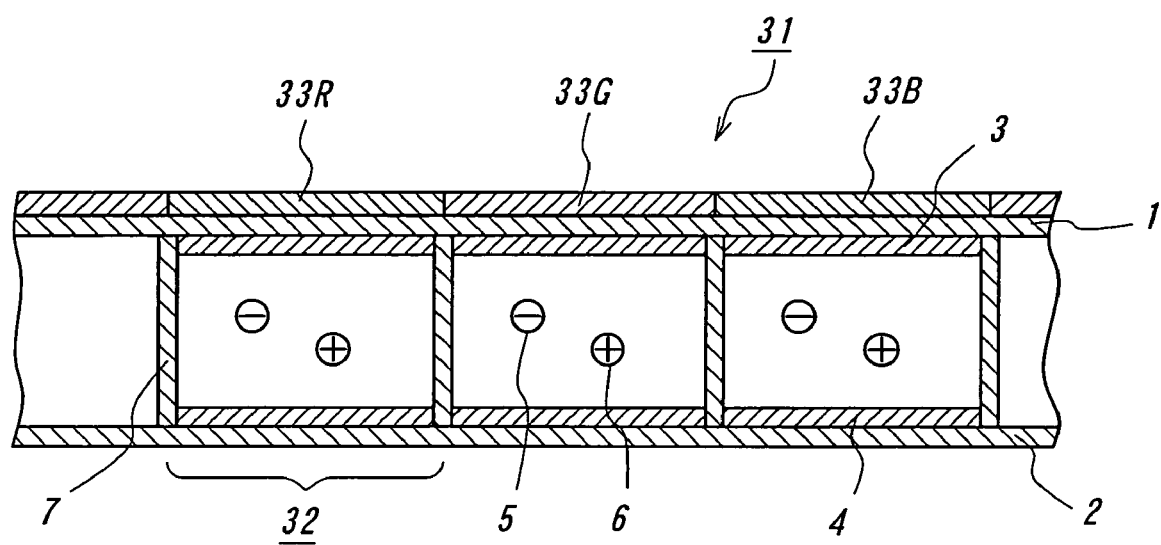
FIG. 8 is a schematic view illustrating one embodiment of the image display panel in which a color display is performed on one surface and a monochrome display is performed on the other surface in the image display device according to the second aspect of the invention.

Then, it is assumed that: one pixel of the image is constructed by three units (in this case use may be made of a multiple of three) for example of the image display element shown in FIGS. 1a-1c; RGB color filters 33R, 33G, 33B are provided on an outer surface of the transparent substrate 1 or the transparent opposed substrate 2 of respective image display elements 32 as shown in FIG. 8; and for example a color of the negatively chargeable particles 5 is white and a color of the positively chargeable particles 6 is black. In this case, it is possible to perform a color display on a surface of the image display panel 31 to which the color filters 33R, 33G, 33B are provided and to perform a monochromic display on the other surface by controlling a direction and strength of an electrostatic field generated by a pair of electrodes constructed by the display electrode 3 and the opposed electrode 4 in respective image display elements 32. In the color display, the black color display can be performed by controlling the particles in such a manner that the black color particles exist on all the surfaces of the image display elements 32 at a side to which the color filters 33R, 33G, 33B are arranged; the white color display can be performed by controlling the particles in such a manner that the white color particles exist on all the surfaces of the image display elements 32 at a side to which the color filter 33R, 33G, 33B are arranged so as to synthesize RGB colors; and the other color display can be performed by controlling an amount of the white color particles on respective surfaces of the image display elements 32 to which the color filters 33R, 33G, 33B are arranged so as to synthesize RGB colors. In this embodiment, it is not possible to display corresponding images on both surfaces at the same time, and thus use is made of each surface one by one.

Figure 9:
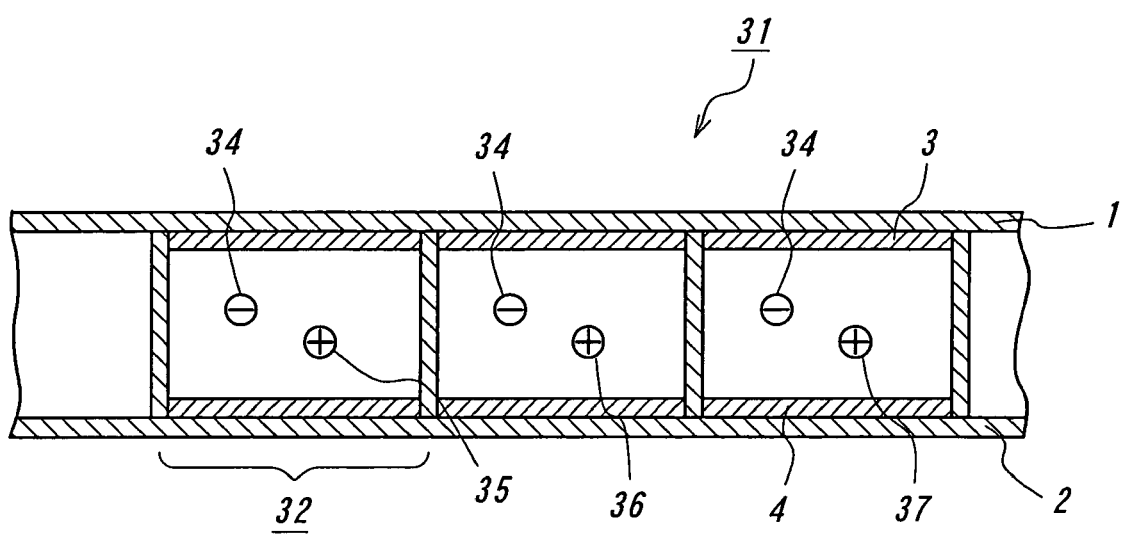
FIG. 9 is a schematic view depicting one embodiment of the image display panel in which a color display is performed on both surfaces in the image display device according to the second aspect of the invention.

Further, it is assumed that one pixel of the image is constructed by three units for example of the image display element shown in FIGS. 1a-1c, and, as shown in FIG. 9, black color particles 34 and red color particles 35; black color particles 34 and green color particles 36; and black color particles 34 and blue color particles 37; having inverted charge characteristics with each other are filled in respective image display elements 32. In this case, it is possible to perform a color display on both surfaces of the image display panel 31 by controlling a direction and strength of an electrostatic field generated by a pair of electrodes constructed by the display electrode 3 and the opposed electrode 4 in respective image display elements 32. In the color display, the black color display can be performed by controlling the particles in such a manner that the black color particles 34 exist on all the surfaces of the image display elements 32 at a side to be displayed; the white color display can be performed by controlling the particles in such a manner that the red color particles 35, the green color particles 36 and the blue color particles 37 exist respectively on respective surfaces of the image display elements 32 at a side to be displayed so as to synthesize RGB colors; and the other color display can be performed by controlling amounts of the red color particles 35, the green color particles 36 and the blue color particles 37 respectively on respective surfaces of the image display elements 32 so as to synthesize RGB colors. In this embodiment, it is not possible to display corresponding images on both surfaces at the same time, and thus use is preferably made of each surface one by one.

Hereinafter, respective members used in the image display device according to the invention will be explained in detail.

In the first aspect of the invention, at least one of the substrates is the transparent substrate through which a color of the particles can be observed from outside of the device, and it is preferred to use a material having a high transmission factor of visible light and an excellent heat resistance. On the other hand, in the second aspect of the invention, the substrates are the transparent substrate through which a color of the particles can be observed from outside of the device, and it is preferred to use a material having a high transmission factor of visible light and an excellent heat resistance. Whether a flexibility of the substrate is necessary or not is suitably selected in accordance with its use. For example, it is preferred to use a material having flexibility for the use of electronic paper and so on, and it is preferred to use a material having no flexibility for the use of a display of portable device such as mobile phone, PDA, laptop computer and so on.

Examples of the substrate material include polymer sheets such as polyethylene terephthalate, polymer sulfone, polyethylene, polycarbonate, polyimide or acryl and inorganic sheets such as glass, quartz or so. In the first aspect of the invention, the opposed substrate may be transparent or may be opaque. The thickness of the substrate is preferably 2 to 5000 μm, more preferably 5 to 1000 μm. When the thickness is too thin, it becomes difficult to maintain strength and distance uniformity between the substrates, and when the thickness is too thick, vividness and contrast as a display capability degrade, and in particular, flexibility in the case of using for an electronic paper deteriorates.

Moreover, as shown in FIGS. 1a to 1c and FIGS. 2a to 2c, it is preferable to form partition walls 7 around each display element. The partition walls may be formed in two parallel directions. By this structure, unnecessary particle movement in the direction parallel with the substrate is prevented. Further, durability repeatability and memory retention are assisted. At the same time, the distance between the substrates is made uniform as reinforcing the strength of an image display panel. The formation method of the partition wall is not particularly restricted, however, a screen printing method wherein pastes are overlapped by coating repeatedly on a predetermined position by screen plate; a sandblast method wherein partition materials are painted with a desired thickness entirely over the substrate and then after coating resist pattern on the partition materials which is wanted to be left as a partition, jetting abrasive to cut and remove partition materials aside from the partition part; lift-off method (additive method) wherein a resist pattern is formed on the substrate using photosensitive polymer, and then after burying paste into a resist recess, removing the resist; photosensitive paste method wherein the photosensitive resin composition containing the partition materials is applied over the substrate and then obtaining a desired pattern by exposure & developing; and mold formation method wherein paste containing the partition materials is applied over the substrate and then forming a partition by compression bonding & pressure forming the dies having rugged structure; and so on are adopted. Further, modifying the mold formation method, relief embossing method wherein a relief pattern provided by a photo-sensitive polymer composition is used as a mold is also adopted.

With respect to the electrodes, in the case of the display electrode arranged on the transparent substrate, respective electrodes consisting of the matrix electrode is formed of electroconductive materials, which are transparent and having pattern formation capability. In the second aspect of the invention, both of the display electrode and the opposed electrode are transparent. As such electroconductive materials, metals such as aluminum, silver, nickel, copper and gold, or transparent electroconductive metal oxides such as ITO, electroconductive tin oxide and electroconductive zinc oxide formed in the shape of thin film by sputtering method, vacuum vapor deposition method, CVD method, and coating method, or coated materials obtained by applying the mixed solution of an electro-conductive agent with a solvent or a synthetic resin binder are used.

Typical examples of the electroconductive materials include cationic polyelectrolyte such as benzyltrimethylammonium chloride, tetrabutylammonium perchlorate and so on, anionic polyelectrolyte such as polystyrenesulfonate, polyacrylate, and so on, or electro-conductive fine powders of zinc oxide, tin oxide, or indium oxide. Additionally, the thickness of the electrode may be suitable unless the electroconductivity is absent or any hindrance exists in optical transparency, and it is preferable to be 3 to 1000 nm, more preferable to be 5 to 400 nm. The foregoing transparent electrode materials can be employed as the opposed electrode, however, non-transparent electrode materials such as aluminum, silver, nickel, copper, and gold can be also employed in the first aspect of the invention.

It is preferred that an insulation coating layer is formed on the electrode so as not to reduce charges of the charged particles. As such insulation coating layer, if use is made of a positively chargeable resin with respect to the negatively chargeable particles and a negatively chargeable resin with respect to the positively chargeable particles, the charges of the particles are to be difficult to reduce and it is particularly preferable.

Then, the particles used for the image display device according to the first embodiment of the first aspect and the second aspect of the invention will be explained.

As the particles, although any of colored particles negatively or positively chargeable having capability of flying and moving by Coulomb's force are employable, spherical particles with light specific gravity are particularly preferable. The average particle diameter is preferable to be 0.1 to 50 μm, particularly to be 1 to 30 μm. When the particle diameter is less than this range, charge density of the particles will be so large that an imaging force to an electrode and a substrate becomes too strong; resulting in poor following ability at the inversion of its electric field, although the memory characteristic is favorable. On the contrary, when the particle diameter exceeds the range, the following ability is favorable, however, the memory characteristic will degrade.

Although the method for charging the particles negatively or positively is not particularly limited, a corona discharge method, an electrode injection-charge method, a friction charge method and so on are employable. A charge amount of the particles is depend on the measuring condition, i.e., the charge amount of the particles in the image display device is depend on its initial charge amount, a contact with the substrate, a contact between the particles having different kinds, and a charge decrease due to a lapse of time. Particularly, it is understood that a main factor is "the contact between the particles having different kinds", i.e., a saturated value of a charge behavior due to the contact between two particles. Therefore, it is important to know a difference of the charge characteristics between two particles on the charge amount, i.e., to know a difference of a work function. However, it is difficult to know these differences by an easy measurement.

The inventors investigated theses differences and find that it is possible to estimate these differences relatively by using same carriers and measuring the charge amount of respective particles by means of a blow-off method. Moreover, if the measuring results are defined by a surface charge density, it is possible to perform an estimation of the charge amount of the particles as a suitable method for the image display device.

The measuring method will be explained later in detail. By performing the blow-off method, it is possible to contact the particles and the carrier particles sufficiently and to measure the charge amount per unit weight of respective particles by measuring its saturated charge amount. Then, it is possible to calculate the surface charge density of respective particles by obtaining a particle diameter and a specific gravity of respective particles separately.

In the image display device, since a particle diameter of the particles to be used is small and an affection of gravity is too small to neglect its affection, the specific gravity is not affected to the movement of the particles. However, on the charge amount of the particles, if the particles have a same particle diameter and a same average charge amount per unit weight, the maintained charge amounts are different by two times in the case that the specific gravities of the particles are different by two times. Therefore, it is understood that it is preferred to estimate the charge characteristics of the particles used in the image display device by the surface charge density (unit: $\mu C/m^2$) which is irrelevant to the specific gravity of the particles.

Then, when the difference of this surface charge density is sufficiently large between the particles, two groups of the particles maintain the charge amounts of different characteristics by contacting them with each pother and a function of the movement by an electrostatic field is also maintained.

Here, it is necessary to obtain some degree of difference on the surface charge density so as to differentiate the charge characteristics of the two particles, but it is not always necessary to make the difference on the surface charge density larger. In the image display device utilizing the particle movement, when a particle diameter of the particles is large, the main factor for determining a fly/move electrostatic field (voltage) of the particles is an electric imaging force. Therefore, in order to move the particles by a low electrostatic field (voltage), it is preferred to make the charge amount low. Moreover, when a particle diameter of the particles is small, the main factor for determining the fly/move electrostatic field (voltage) is a non-electric force such as an intermolecular force, a liquid bridging force and so on. Therefore, in order to move the particles by a low electrostatic field (voltage), it is preferred to make the charge amount high. However, since theses phenomena are largely depend on surface properties (material, shape) of the particles, it is not possible to define only by the particle diameter and the charge amount.

The inventors find that, in the particles having an average particle diameter of 0.1-50 μm, when the absolute value of the difference between the surface charge densities of two groups of particles, which are measured by the blow-off method using the same kind of particles, is 5-150 $\mu C/m^2$, it is possible to obtain the particles usable for the image display device.

Measuring theory and method of the blow-off method are as follows. In the blow-off method, a mixture of the particles and the carriers are placed into a cylindrical container with nets at both ends, and high-pressure gas is blown from the one end to separate the particles and the carriers, and then only the particles are blown off from the mesh of the net. In this occasion, charge amount of reverse blown polarity remains on the carriers with the same charge amount of the particles carried away out of the container. Then, all of electric flux by this electric charge are collected to Faraday cage, and are charged across a capacitor with this amount. Accordingly, the charge amount of the particles is determined as Q=CV (C: capacity, V: voltage across both ends of the capacitor) by measuring potential of both ends of the capacitor.

In the invention, as a blow-off powder charge amount measuring instrument, TB-200 produced by Toshiba Chemical Co., Ltd. was used, and F963-2535 available from Powder TEC Co., Ltd. was employed as the same kind of carriers. Then, the charge density per unit surface area (unit: $\mu C/m^2$) was measured.

The particle diameter was measured in accordance with the following method. Moreover, the specific gravity was measured with the use of a hydrometer produced by Shimadzu Seisakusho Ltd. (brand name: Multi volume Density Meter H1305).

Specifically, the particle diameter was measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory). Then, it was assumed that an average particle diameter d(0.5) (μm) was a particle diameter indicated by μm at which the particle diameters of 50% of particles were larger and the particle diameters of 50% of particles were smaller.

Because it is necessary for the particles to hold the charged electric charge, insulating particles with the volume specific resistance of $1 \times 10^{10}$ Ω·cm or greater are preferable, and in particular, insulating particles with the volume specific resistance of $1 \times 10^{12}$ Ω·cm or greater are more preferable.

Further, the particles with slow charge attenuation property evaluated by the measuring method below are more preferable. That is, the particles are made into a film having a thickness of 5-100 μm by means of a press method, a heating/melting method, a casting method and so on, and the voltage of 8 kV is applied to a Corona generator disposed with a distance of 1 mm to the film surface so as to generate Corona discharge, which charges the film surface. Then, the change of the surface potential is measured to determine the suitability. In this occasion, it is preferable to select the material whose maximum surface potential will be greater than 300 V after 0.3 seconds, more preferable to select the material whose maximum surface potential will be greater than 400 V after 0.3 second as the material for composing the particles.

Figure 10:
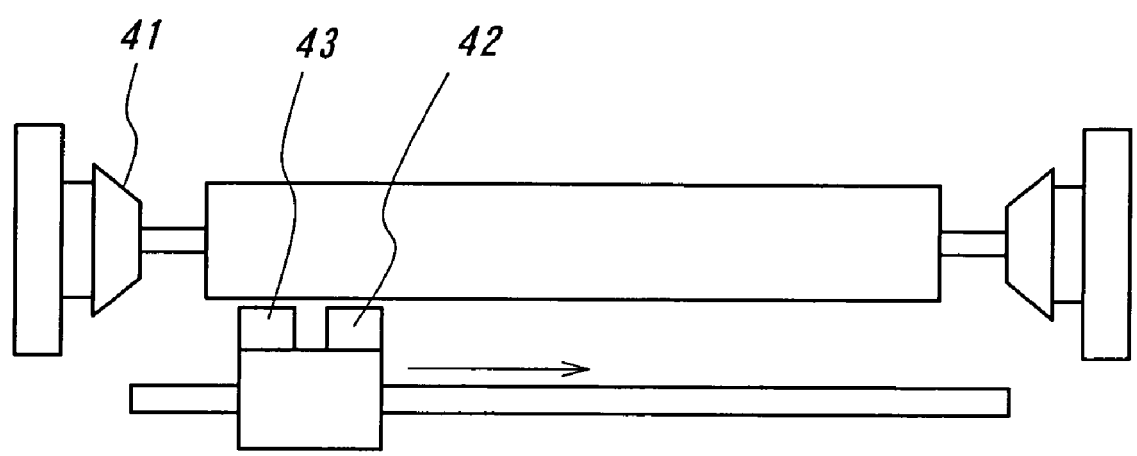
FIG. 10 is a schematic view showing a method of measuring a surface potential of a particle used in the image display device according to a first embodiment of the first aspect and the second aspect of the invention.

Additionally, the foregoing surface potential is measured by means of an instrument (CRT2000 produced by QEA Inc.) as shown in FIG. 10. In this instrument both end portions of a roll shaft being held with chuck 41, compact scorotron discharger 42 and surface potential meter 43 are spaced with predetermined interval to form a measurement unit. Facedly deploying the measurement unit with a distance of 1 mm from the surface of the particles, and by moving the measurement unit from one end portion of the roll shaft to the other end portion with an uniform speed, with the state that the roll shaft remains stopping and while giving surface charge, a method of measuring its surface potential is preferably adopted. Moreover, measurement environment should be settled at the temperature of 25±3° C. and the humidity of 55±5% RH.

If the particles satisfy electrostatic property and so on, the particles may be formed by any materials. For example, it is formed by resin, charge control agent, coloring agent, inorganic additive and so on, or, by coloring agent and so on only.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds of organic or inorganic pigments or dye as will be described below are employable.

Examples of black pigments include carbon black, copper oxide, manganese dioxide, aniline black, and activate carbon. Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, and tartrazinelake. Examples of orange pigments include red chrome yellow, molybdenum orange, permanent orange GTR, pyrazolone orange, Balkan orange, indusren brilliant orange RK, benzidine orange G, and Indusren brilliant orange GK. Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, and brilliant carmine 3B.

Examples of purple pigments include manganese purple, first violet B, and methyl violet lake. Examples of blue pigments include Berlin blue, cobalt blue, alkali blue lake, Victoria blue lake, phthalocyanine blue, metal-free phthalocyanine blue, partially chlorinated phthalocyanine blue, first sky blue, and Indusren blue BC. Examples of green pigments include chrome green, chromium oxide, pigment green B, Malachite green lake, and final yellow green G. Further, examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc. These coloring agents may be used alone or in combination of two or more kinds thereof. Particularly, carbon black is preferable as the black coloring agent, and titanium oxide is preferable as the white coloring agent.

Although the manufacturing method of the particles is not specifically restricted, mixing/grinding method or polymerization method for producing toner of electrophotography is, for example, similarly employable. Further the method of coating resin or charge control agent and so on over the surface of powders such as inorganic or organic pigments is also employable.

The distance between the transparent substrate and the opposed substrate is suitably adjusted in a manner where the particles can move and maintain the contrast of image display; however, it is adjusted usually within 10 to 5000 μm, preferably within 30 to 500 μm. The particle filling amount (volume occupying rate) of the particles existing in the space between the faced substrates is preferable to be 10 to 80%, more preferable to be 10 to 70%.

In the image display panel used in the image display device according to the invention, plural of the foregoing display elements are dispose in a matrix form, and images can be displayed. In the case of monochrome display, one display element makes one pixel. In the case of full color display, three kinds of display elements, i.e., one group of display elements each having color plate of R (red), G (green) and B (blue) respectively and each having particles of black composes a set of disposed elements preferably resulting in the reversible image display panel having the sets of the elements.

Then, the liquid powders used for the image display device according to the second embodiment of the first aspect and the second aspect of the invention will be explained.

As mentioned above, the liquid powder is an intermediate material having both of liquid properties and particle properties and exhibiting a self-fluidity without utilizing gas force and liquid force. The liquid powder becomes particularly an aerosol state, and thus, in the image display device according to the invention, it is utilized under such a condition that a solid material is floated in a gas as a dispersant in a relatively stable manner.

As the aerosol state, it is preferred that an apparent volume in a maximum floating state is two times or more than that in none floating state, more preferably 2.5 times or more than that in none floating state, and most preferably three times or more than that in none floating state. In this case, an upper limit is not defined, but it is preferred that an apparent volume is 12 times or smaller than that in none floating state.

If the apparent volume in the maximum floating state is smaller than two times, a display controlling becomes difficult. On the other hand, if the apparent volume in the maximum floating state is larger than 12 times, a handling inconvenience during a liquid powder filling operation into the device such as a particle over-scattering occurs. That is, it is measured by filling the liquid powder in a transparent closed vessel through which the liquid powder is seen; vibrating or dropping the vessel itself to obtain a maximum floating state; and measuring an apparent volume at that time from outside of the vessel. Specifically, the liquid powder having a volume ⅕ of the vessel is filled as the liquid powder in a vessel with a polypropylene cap having a diameter (inner diameter) of 6 cm and a height of 10 cm (product name I-boy® produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the image display device according to the invention, it is preferred that a time change of the apparent volume of the liquid powder satisfies the floating formula:

$$V_{10}/V_5 > 0.8;$$

here, $V_5$ indicates the apparent volume (cm$^3$) of the liquid powder after 5 minutes from the maximum floating state; and $V_{10}$ indicates the apparent volume (cm$^3$) of the liquid powder after 10 minutes from the maximum floating state. In this case, in the image display device according to the invention, it is preferred to set the time change $V_{10}/V_5$ of the apparent volume of the liquid powder to larger than 0.85, more preferably larger than 0.9, most preferably larger than 0.95. If the time change $V_{10}/V_5$ is not larger than 0.8, the liquid powder is substantially equal to normal particles, and thus it is not possible to maintain a high speed response and durability according to the invention.

Moreover, it is preferred that the average particle diameter d(0.5) of the particle materials constituting the liquid powder is 0.1-20 μm, more preferably 0.5-15 μm, most preferably 0.9-8 μm. If the average particle diameter d(0.5) is less than 0.1 μm, a display controlling becomes difficult. On the other hand, if the average particle diameter d(0.5) is larger than 20 μm, a display is possible, but opacifying power is decreased and thus a thin shape device is difficult. Here, the average particle diameter d(0.5) of the particle materials constituting the liquid powder is equal to d(0.5) in the following particle diameter distribution Span.

It is preferred that particle diameter distribution Span of the particle material constituting the liquid powder, which is defined by the following formula, is not more than 5 preferably not more than 3:

Particle diameter distribution Span=(d(0.9)−d(0.1))/d (0.5); here, d(0.5) means a value of the particle diameter expressed by μm wherein an amount of the particle material constituting the liquid powder having the particle diameter larger than this value is 50% and an amount of the particle material constituting the liquid powder having the particle diameter expressed by μm wherein an amount of the particle material constituting the liquid powder having a particle diameter smaller than this value is 10%, and d(0.9) means a value of the particle diameter expressed by μm wherein an amount of the particle material constituting the liquid powder having the particle diameter smaller than this value is 90%. If the particle diameter distribution Span of the particle materials constituting the liquid powder is set to not more than 5, the particle diameter becomes even and it is possible to perform an even liquid powder movement.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powder may be formed by mixing necessary resin, charge control agent, coloring agent, additive and so on and grinding them, or, by polymerizing from monomer, or, by coating a particle with resin, charge control agent, coloring agent, and additive and so on. Hereinafter, typical examples of resin, charge control agent, coloring agent, additive and so on constituting the liquid powder will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers.

Examples of the electric charge control agent include, positive charge control agent include the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of basic or acidic dye may be employable. Examples include Nigrosine, Methylene Blue, quinoline yellow, rose bengal and do on.

Examples of the inorganic additives include titanium oxide, Chinese white, zinc sulfide, antimonial oxide, calcium carbonate, zinc white, talc, silica, calcium silicate, alumina white, cadmium yellow, cadmium red, cadmium orange, titanium yellow, iron blue, ultramarine blue, cobalt blue, cobalt green, cobalt violet, ferric oxide, carbon black, copper powder, aluminum powder and so on.

However, if the above materials are only mixed or coated with no contrivance, the liquid powder exhibiting an aerosol state cannot be obtained. The regular method of forming the liquid powder exhibiting an aerosol state is not defined, but the following method is preferably used.

At first, inorganic fine particles having an average particle size of 20-100 nm preferably 20-80 nm are preferably fixed on a surface of materials constituting the liquid powder. Moreover, it is preferred to treat the inorganic fine particles by a silicone oil. Here, as for the inorganic fine particles, use may be made of silicon dioxide (silica), zinc oxide, aluminum oxide, magnesium oxide, cerium oxide, ferric oxide, copper oxide and so on. In this case, a method of fixing the inorganic fine particles is important. For example, use may be made of hybridizer (NARA-KIKAI Industry Co., Ltd.) or mechanofusion (Hosokawa Micron Co., Ltd.), and the liquid powders showing an aerosol state are formed under a predetermined condition (for example processing time).

Here, in order to further improve a repeating durability, it is effective to control a stability of the resin constituting the liquid powder, especially, a water absorbing rate and a solvent insoluble rate. It is preferred that the water absorbing rate of the resin constituting the liquid powder sealed between the substrates is not more than 3 wt % especially not more than 2 wt %. In this case, a measurement of the water absorbing rate is performed according to ASTM-D570 and a measuring condition is 23° C. for 24 hours. As for the solvent insoluble rate of the liquid powder, it is preferred that a solvent insoluble rate of the liquid powder, which is defined by the following formula, is not less than 50% more preferably not less than 70%:

$$\text{solvent insoluble rate}(\%) = (B/A) \times 100;$$

(here, A is a weight of the liquid powder before being immersed into the solvent and B is a weight of resin components after the liquid powder is immersed into good solvent at 25° C. for 24 hours).

If the solvent insoluble rate is less than 50%, a bleed is generated on a surface of the particle material constituting the liquid powder when maintaining for a long time. In this case, it affects an adhesion power with the liquid powder and prevent a movement of the liquid powder. Therefore, there is a case such that it affects a durability of the image display. Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

As for a filling amount of the liquid powder, it is preferred to control an occupied volume (volume occupied rate) of the liquid powder to 5-85 vol %, more preferably 5-65 vol %, most preferably 10-55 vol % of a space between the opposed substrates. Since the liquid powder exhibits an aerosol state, it is difficult to use a normal filling method for filling the liquid powder in the display device. In this case, it is preferred to use an electrostatic plating apparatus and to adhere the liquid powder to the substrate by force so as to perform an easy handling. In addition, the liquid powder may be adhered to one of the substrates or may be adhered to both of the substrates, and then the substrates are connected.

Further, in the present invention, it is important to control a gas in a gap surrounding the liquid powder between the substrates, and a suitable gas control contributes an improvement of a display stability. Specifically, it is important to control a humidity of the gap gas to not more than 60% RH at 25° C., preferably not more than 50% RH, more preferably not more than 35% RH. The above gap means a gas portion surrounding the liquid powder obtained by substituting an occupied portion of the liquid powder 5, 6, an occupied portion of the partition wall 4 and a seal portion of the device from the space between the opposed substrates 1 and 2 in FIGS. 1*a*-1*c* and FIGS. 2*a*-2*c*.

A kind of the gap gas is not limited if it has the humidity mentioned above, but it is preferred to use dry air, dry nitrogen gas, dry helium gas, dry carbon dioxide gas, dry methane gas and so on. It is necessary to seal this gas in the device so as to maintain the humidity mentioned above. For example, it is important to perform the operations of filling the liquid powder and assembling the substrate under an atmosphere having a predetermined humidity and to apply a seal member and a seal method for preventing a humidity inclusion from outside of the device.

The image display device according to the invention is applicable to the image display unit for mobile equipment such as notebook personal computers, PDAs, cellular phones and so on; to the electric paper for electric book, electric newspaper and so on; to the bulletin boards such as signboards, posters, blackboards and so on; to the rewritable paper substituted for a paper of copy machine, printer and so on; and to the image display unit for electric calculator, home electric application products, auto supplies and so on.

The image display device according to the invention is applicable to the image display unit for mobile equipment such as notebook personal computers, PDAs, cellular phones and so on; to the electric paper for electric book, electric newspaper and so on; to the bulletin boards such as signboards, posters, blackboards and so on; to the rewritable paper substituted for a paper of copy machine, printer and so on; to the image display unit for electric calculator, home electric application products, auto supplies and so on; to the card display unit for point card and so on; to an electric advertisement; and to an electric POP.

INDUSTRIALLY APPLICABILITY

As clearly understood from the above explanations, in the first aspect of the invention, since the image display panel has a construction such that no backlight is utilized, it is possible to arrange the chip for transmitting a drive signal to the image display panel in the substrate. Therefore, it is possible to remove TCP, which is necessary arrange at a portion protruded from an image display portion of the known image display panel, and thus it is possible to achieve a compact size and a narrow frame of the image display panel.

Moreover, in the second aspect of the invention, since all the substrates and all the electrodes of the image display panel are constructed by the transparent substrate and the transparent electrode, it is possible to display the image not only on a front surface but also on a rear surface. In this manner, the image display panel of a very thin type can be realized, and it is possible to add different functions (for example, one surface: monochrome display and the other surface: color display) to respective surfaces, so that it is possible to realize the high performance image display device.

The invention claimed is:

1. An image display device which comprises an image display panel, in which liquid powders, which indicate a high fluidity in an aerosol state such that solid-like substances are suspended in a gas stably as dispersoid, are sealed between two opposing substrates, at least one of two substrates being transparent, and, in which the liquid powders, to which an electrostatic field produced by a pair of electrodes provided on one substrate or both substrates respectively is applied, are made to move so as to display an image, and wherein a chip for transmitting a drive signal to the image display panel is arranged in at least one of the substrates and an apparent volume in a maximum floating state of the liquid powders is two times or more than that in none floating state.

2. The image display device according to claim 1, wherein an average particle diameter d(0.5) of the liquid powders is 0.1-20 μm.

3. An image display device which comprises an image display panel, in which liquid powders, which indicate a high fluidity in an aerosol state such that solid-like substances are suspended in a gas stably as dispersoid, are sealed between two opposing substrates, at least one of two substrates being transparent, and, in which the liquid powders, to which an electrostatic field produced by a pair of electrodes provided on one substrate or both substrates respectively is applied, are made to move so as to display an image, and wherein a chip for transmitting a drive signal to the image display panel is arranged in at least one of the substrates and a time change of the apparent volume of the liquid powders satisfies the following formula:

$$V_{10}/V_5 > 0.8;$$

here, $V_5$ indicates the apparent volume (cm$^3$) of the liquid powders after 5 minutes from the maximum floating state; and $V_{10}$ indicates the apparent volume (cm$^3$) of the liquid powders after 10 minutes from the maximum floating state.

4. The image display device according to claim 3, wherein an average particle diameter d(0.5) of the liquid powders is 0.1-20 μm.

* * * * *